US009916552B2

(12) United States Patent
Tsuda et al.

(10) Patent No.: US 9,916,552 B2
(45) Date of Patent: *Mar. 13, 2018

(54) WORKFLOW SYSTEM AND METHOD WITH SKIP FUNCTION

(71) Applicant: International Business Machines Corporation, Armonk, NY (US)

(72) Inventors: Kazuyuki Tsuda, Tokyo-to (JP); Hiroyasu Ohsaki, Kanagawa-ken (JP); Ryohichi Yoshimura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 639 days.

This patent is subject to a terminal disclaimer.

(21) Appl. No.: 14/197,191

(22) Filed: Mar. 4, 2014

(65) Prior Publication Data

US 2014/0195293 A1   Jul. 10, 2014

Related U.S. Application Data

(63) Continuation of application No. 10/056,106, filed on Jan. 25, 2002, now Pat. No. 8,688,498.

(30) Foreign Application Priority Data

Jan. 29, 2001   (JP) .................................. 2001-20770

(51) Int. Cl.
*G06Q 10/00* (2012.01)
*G06Q 10/06* (2012.01)
*G06Q 10/04* (2012.01)
*G06Q 10/10* (2012.01)

(52) U.S. Cl.
CPC ....... *G06Q 10/06316* (2013.01); *G06Q 10/04* (2013.01); *G06Q 10/10* (2013.01)

(58) Field of Classification Search
CPC ... G06Q 10/06316; G06Q 10/04; G06Q 10/10
See application file for complete search history.

(56) References Cited

U.S. PATENT DOCUMENTS 6,308,163 B1 * 10/2001 Du ........................ G06Q 10/06
                                                               705/7.13
6,349,238 B1 *  2/2002 Gabbita ................ G06Q 10/10
                                                               700/100

(Continued)

FOREIGN PATENT DOCUMENTS

JP          0134127         5/1998
JP           301998        11/1998

(Continued)

OTHER PUBLICATIONS

An object-oriented organizational model to support dynamic role-based access control in electronic commerce EC Cheng—Decision Support Systems, 2000—Elsevier.*

(Continued)

*Primary Examiner* — Jonathan G Sterrett
(74) *Attorney, Agent, or Firm* — Steven M. Greenberg, Esq.; CRGO Law

(57) ABSTRACT

Delay in a workflow is avoided by introducing a skip operation upon execution of the workflow. Additionally, a person in charge of the workflow eventually participates in the workflow process even if he/she has been skipped. The workflow design defines skippable activities, in advance, as well as re-execution points in order to reassign the skipped activities.

12 Claims, 7 Drawing Sheets

(56) References Cited

U.S. PATENT DOCUMENTS

| | | | |
|---|---|---|---|
| 6,505,176 B2 * | 1/2003 | DeFrancesco, Jr. ... | G06Q 10/10 |
| | | | 705/38 |
| 2002/0046072 A1 * | 4/2002 | Arai ................ | G06Q 10/06316 |
| | | | 705/7.26 |

FOREIGN PATENT DOCUMENTS

| | | |
|---|---|---|
| JP | 113093 | 4/2000 |
| JP | 0137763 | 5/2000 |
| JP | 222508 | 8/2000 |
| JP | 105623 | 11/2000 |

OTHER PUBLICATIONS

Semantic workflow interoperability F Casati, S Ceri, B Pernici, G Pozzi—International Conference on . . . , 1996—Springer.*

The application of security policy to role-based access control and the common data security architecture A Lin, R Brown—Computer Communications, 2000—Elsevier.*

Support for exception handling through workflow management systems W Deiters, T Goesmann, K Just-Hahn . . . —CSCW, Towards . . . , 1998—gcc.uni-paderborn.de.*

"Routing Using Flow Definition Tools," Sunworld, No. 9, vol. 8, pp. 103.

"Workflow Software for All Employees," NIKKEA Computer, No. 419, pp. 120-123.

* cited by examiner

WORKFLOW SYSTEM AND METHOD WITH SKIP FUNCTION

This application is a Continuation Application of U.S. application Ser. No. 10/056,106, filed on Jan. 25, 2002, which claims priority under 35 U.S.C. § 119 to Japanese Patent Application No. 2001-20770, filed Jan. 29, 2001, the entire text of which is incorporated by reference herein.

TECHNICAL FIELD OF THE INVENTION

The present invention relates to improving workflow in an office, and more particularly to a workflow system for reducing the amount of time for completion of processes.

BACKGROUND ART

A workflow system, which defines the procedure for a series of business processes with multiple workers and manages actual workflow to put it into practice, implements management and operation of business processes by means of computerization, thereby making the work more efficient. In terms of efficiency of paperwork in an office, space costs for file cabinets, and environmental problems, etc., there is a significant need to construct a forms processing system to computerize elements of the workflow such as form processing, thereby implementing paperless management. However, actual form processing is so complicated that a paperless forms processing system has not been widely used due to problems of reaction to exception treatments, for example.

As an example of prior art workflow systems, Japanese Published Unexamined Patent Application (PUPA) No. 1998-105623 discloses a technique for dividing and registering definition information for a workflow, wherein the information divided and registered is shared among a plurality of workflows. This enables partial change of the process or partial stop and restart of the process, thereby allowing for efficient and meticulous management. Furthermore, PUPA No. 1998-134127 discloses a technique for, when withdrawing the circular that has been delayed, announcing beforehand to a worker who is presently processing the circular and workers who are to process the circular later, thereby preventing disturbances of business processes of each worker. Furthermore, PUPA No. 2000-137763 discloses a technique for not delaying the business processes if a user in charge of transaction can not conduct the transaction of business processes from unavoidable circumstances, wherein a lapsed time is monitored from when an electronic document was sent to a given node, and if a time limit is reached without completing the transaction, the electronic document is automatically skipped. In addition, there has been proposed a technique wherein an "alternate" is established instead of skipping.

As described above, skip processing has been conventionally conducted automatically to avoid delay of workflow. Also, in stead of skipping, an alternate may be established, wherein another person specified as an alternate can conduct the transaction instead of a person essentially in charge of a transaction. However, with such an "alternate" scheme, it is a prerequisite to establish an alternate in advance, as it does not function at all if the person in charge suddenly becomes unable to complete a transaction. On the other hand, if a manager dynamically establishes an alternate, activities might be able to be processed at that moment, however, the person in charge of the transaction could not be involved at all.

Also, according to the automatic skipping scheme of the above-mentioned PUPA No. 2000-137763, activities for deadline-designated automatic processing are skipped unless a person in charge has conducted the transaction by the designated date, thus this person could not be involved in the process. Namely, if a person in charge is simply skipped, the person is excluded from the process making the business process incomplete as a whole resulting in the workflow being incomplete.

SUMMARY OF THE INVENTION

In order to solve the problems described above, an object of the present invention is to avoid delay of a workflow upon automatic or manual execution of the workflow.

It is another object of the invention to allow the person in charge of the business process to eventually participate in the process even if he/she had been skipped in the course of the workflow.

In view of those purposes, the present invention provides a workflow function which skips delayed activities automatically or manually by other users (process owner or manager, etc.) and allows a person who has been skipped to confirm at a specified point in the process. Namely, in a first aspect of the present invention, there is provided a workflow system, comprising: design computer terminals for designing a workflow; operation computer terminals for executing the workflow; and a workflow server for managing the workflow connected to those terminals via a network, wherein the design computer terminals design the workflow by defining in advance skippable activities and re-execution points to perform reassignment to the skipped activities, and wherein the workflow server performs skip processing and reassignment processing for the operation computer terminals based on the workflow designed. The design computer terminals design the workflow by using a plurality of nodes serving as activities that perform transactions, at least one recovery node serving as the re-execution point, and paths connecting the nodes and recovery node.

In another aspect of the invention, there is provided a workflow system, comprising: computer terminals for executing a workflow; and a workflow server for managing the workflow connected to the computer terminals via a network, wherein the workflow server comprises: means for assigning transactions to predetermined operators, who operate the computer terminals, based on a workflow definition defining a process flow; means for performing skip processing automatically or manually according to directions from the computer terminals, for the operator to whom the transaction is assigned; and means for reassigning the skipped transaction to the operator skipped by the means for performing skip processing.

The computer terminals send completion of the transaction to the workflow server after performing the transaction assigned, wherein the transaction assigning means of the workflow server assigns a next transactor in response to the completion of transaction from the computer terminals.

In a further aspect of the invention, there is provided a workflow server for managing a workflow connected to a plurality of computer terminals, comprising: means for assigning a transaction that is performed as the transaction of business process to predetermined person; means for performing skip processing to skip the transaction assigned to the person; and means for assigning re-execution of the transaction to the skipped persons at predetermined timing in the workflow. The means for performing skip processing performs the skip processing when it receives a skip request from a predetermined computer terminal connected to a network or when predefined conditions are satisfied. The skip request may be, for example, a skip command from an issuer of the workflow to skip manually. The predefined conditions may be that the skip processing is performed automatically when a predefined time period elapses while the transaction was not performed.

In a still further aspect of the invention, there is provided a workflow server for managing a workflow connected to a plurality of computer terminals, comprising: a workflow definition management subsystem for managing workflow definitions, the workflow definition being designed to include skippable nodes and recovery nodes where timing is established to make the skipped nodes perform reprocessing; a process management subsystem for managing processes created by using the workflow definition; a client request management subsystem for accepting a request from a person operating the computer terminal; and a user management subsystem for controlling the person assignment based on stored information about persons.

The process management subsystem ends an activity automatically or manually that is determined to be skipped, the activity serving as transaction for each person forming the process, and then starts a next activity, thereby preferably preventing a transaction delay in order to smoothly perform the transaction. The process management subsystem also stores information about the skipped activity on a skip list, and assigns the skipped activity to the appropriate person by referring to the skip list when proceeding to processing of the recovery node while performing activities in sequence, whereby the skipped person would not be excluded from the process.

In a yet further aspect of the present invention, there is provided an information processing apparatus for defining a workflow to be executed by a plurality of computer terminals connected to a network, comprising: a plurality of nodes corresponding to business processes assigned to persons in charge of execution of the workflow; means for establishing a flow using paths for connecting the plurality of nodes; means for establishing one or more skippable nodes among the plurality of nodes; and means for establishing one or more recovery nodes in the flow that define points on the workflow where transaction is to be re-executed for the skippable nodes.

The means for establishing a flow displays the nodes with predetermined icons and connects the icons using the paths, while the means for establishing recovery nodes displays the recovery nodes with predetermined icons and connects the recovery nodes with predetermined nodes using the paths, whereby the points where the recovery is to be performed are easily established using virtual recovery nodes.

The information processing apparatus further comprises means for defining conditions for causing a skip operation automatically for the skippable nodes established by the means for establishing skippable nodes, thereby saving an issuer or person in charge of the transaction the trouble of skip operations. Specifically, a date and time may be registered as a starting point for skip and timing of processing.

In terms of another category of the present invention, there is provided a method for defining a workflow executed at a plurality of computer terminals, the method comprising the steps of: establishing nodes serving as business processes that are assigned to persons in charge of execution of the workflow; determining whether the nodes established are skippable, for example, by setting flags; and establishing one or more recovery nodes where the persons in charge of the nodes determined to be skippable can re-execute the business processes, if skipped. The method further comprises the steps of: forming a workflow using the nodes established and paths determining a sequence of the business processes; and establishing the recovery nodes at predetermined points on the workflow, thereby determining timing for recovery in the workflow.

The method further comprises the step of establishing conditions for skipping the skippable nodes, thereby determining automatic execution of skips in advance.

In another aspect of the present invention, there is provided a method for executing a workflow executed at a plurality of computer terminals, the method comprising the steps of: assigning activities that are performed as transaction of business processes in the workflow to predetermined persons who operate the computer terminals; performing skip processing to skip one or more activities assigned to the persons; and assigning re-execution of the skipped activities to the persons whose assigned activities have been skipped, at predetermined timing in the workflow.

A list of the activities assigned to each person is stored as a work list, and the transaction is performed by retrieving a transaction request from the work list. Furthermore, information about the persons whose assigned activities has been skipped is stored as a skip list and re-execution of the skipped activities are performed in sequence based on the information stored in the skip list.

In addition, these methods for defining a workflow and methods for executing a workflow may be stored as a program in a storage medium. Namely, the present invention may be provided as a computer-readable storage medium for storing a program code executable by a computer, wherein the program code comprises steps described above to be executed by a computer. The storage medium includes a CD-ROM, for example, wherein a program is read by a CD-ROM reader of computers such as a workflow server or each computer terminal, and then stored in a hard disk drive of these computers to be executed.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
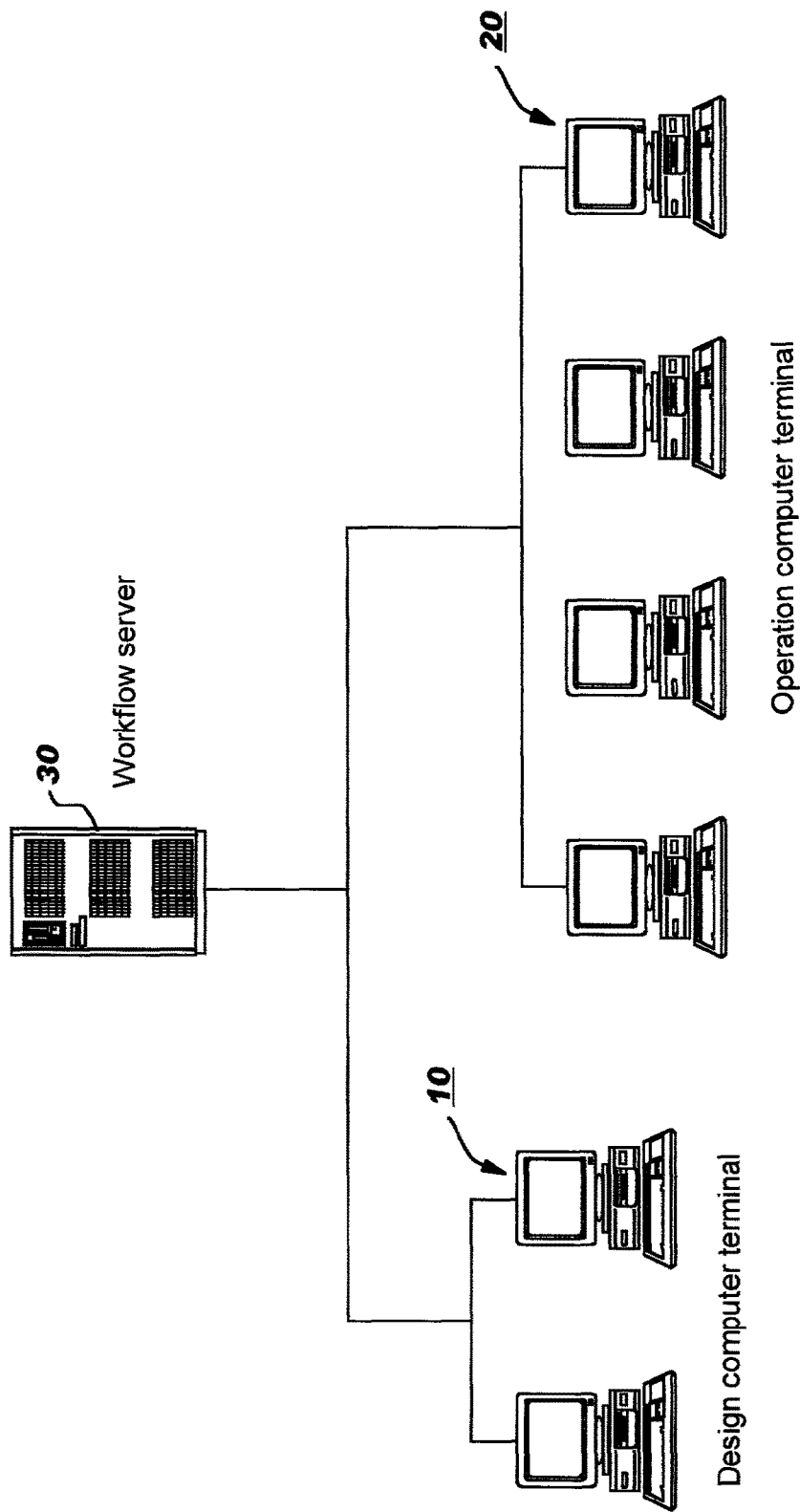
FIG. 1 is a schematic diagram depicting a workflow system in accordance with an embodiment of the present invention.

FIG. 1 is a schematic diagram depicting a workflow system according to an embodiment of the present invention. The workflow system comprises design computer terminals 10 for designing a workflow, operation computer terminals 20 for executing a workflow, which are provided for persons performing business processes, and a workflow server 30 for storing various kinds of programs for executing a workflow. These design computer terminals 10, operation computer terminals 20 and workflow server 30 are connected to each other and form a network. Design computer terminals 10 are provided with a workflow design function and a definition function for implementation of a business process transaction utilizing a workflow system. A person who defines the transaction of business processes (i.e., process designer) defines the procedure of business processes in the workflow system using design computer terminals 10. Operation computer terminals 20, which perform predetermined business processes, are located with each person in charge of transactions.

The person who defines the transactions of business processes connects to the workflow system by inputting his own identification information using design computer terminals 10. Furthermore, he designs a flow of transactions of target business processes and a data structure used in the transactions by using the workflow design function.

Figure 2:
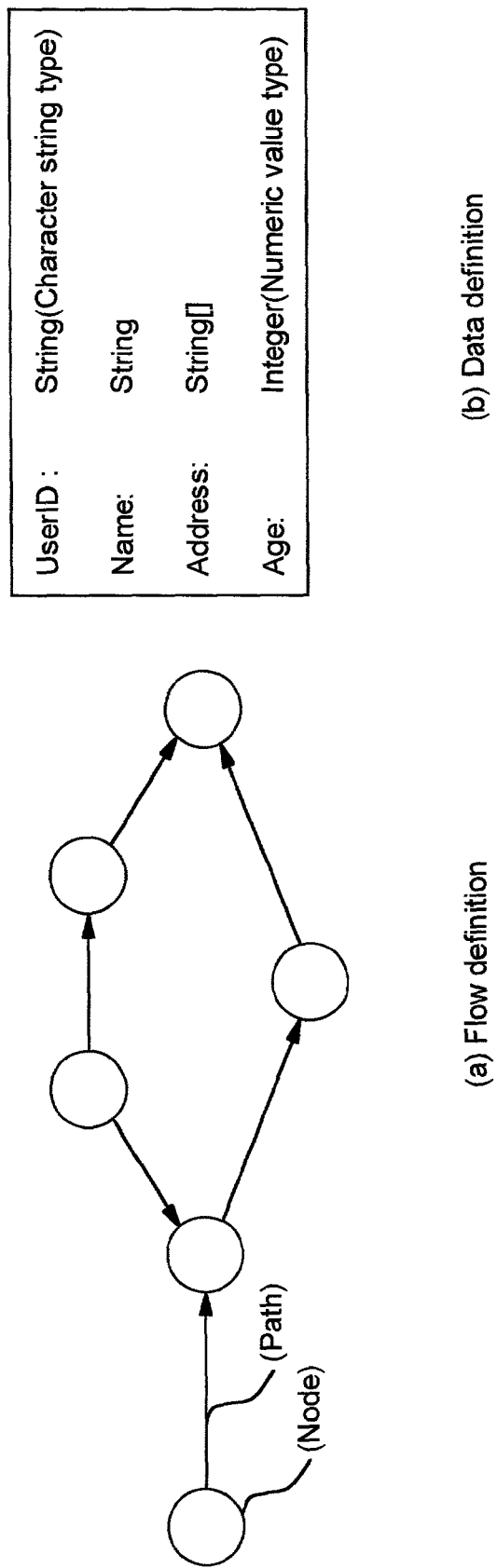
FIGS. 2(a) and 2(b) depict a project (process definition) showing a transaction flow of target business processes.

FIGS. 2(*a*) and 2(*b*) depict a project (process definition) showing a flow of transactions of target business processes, wherein FIG. 2(*a*) is an example of flow definition. A flow of transactions is represented by such a graph representation. On the other hand, FIG. 2(*b*) is an example of data definition that is referred to in the flow definition. In FIG. 2(*a*), a circle is called a node, which indicates predetermined business processes assigned to a person (in charge of transactions). An arrow is called a path, which indicates a sequence of the transactions of predetermined business processes, that is, a connection of transactions. According to the embodiment of the present invention, it is assumed that a single data definition is referred to at all nodes and that data transfer required between each transaction complies with a path shown by an arrow. However, a plurality of data definitions may exist and data transfer may be defined by different paths. In FIG. 2(*b*), a user ID and user name are defined as "string" (character string type), while an address is defined as "string[ ]" and an age is defined as "integer" (numeric value type).

A process designer, using the design computer terminal 10, arranges nodes with a design tool and then connects paths in order to determine the processing sequence. The process designer can define attributes for nodes and paths. The attributes for nodes include a node ID, a node name, and a person in charge of operation. Specification of a person in charge of operation includes a direct specification for input of a user ID directly, a relational specification indicated by relations with other users in charge of transaction (e.g., a superior of the user of node A), and data reference specification where a user in charge of transaction is determined by values of fields in the data definition such as shown in FIG. 2(*b*). In an embodiment of the present invention, "skippable" setting is possible as a property of each node (activity) when a process designer designs the process.

Figure 3:
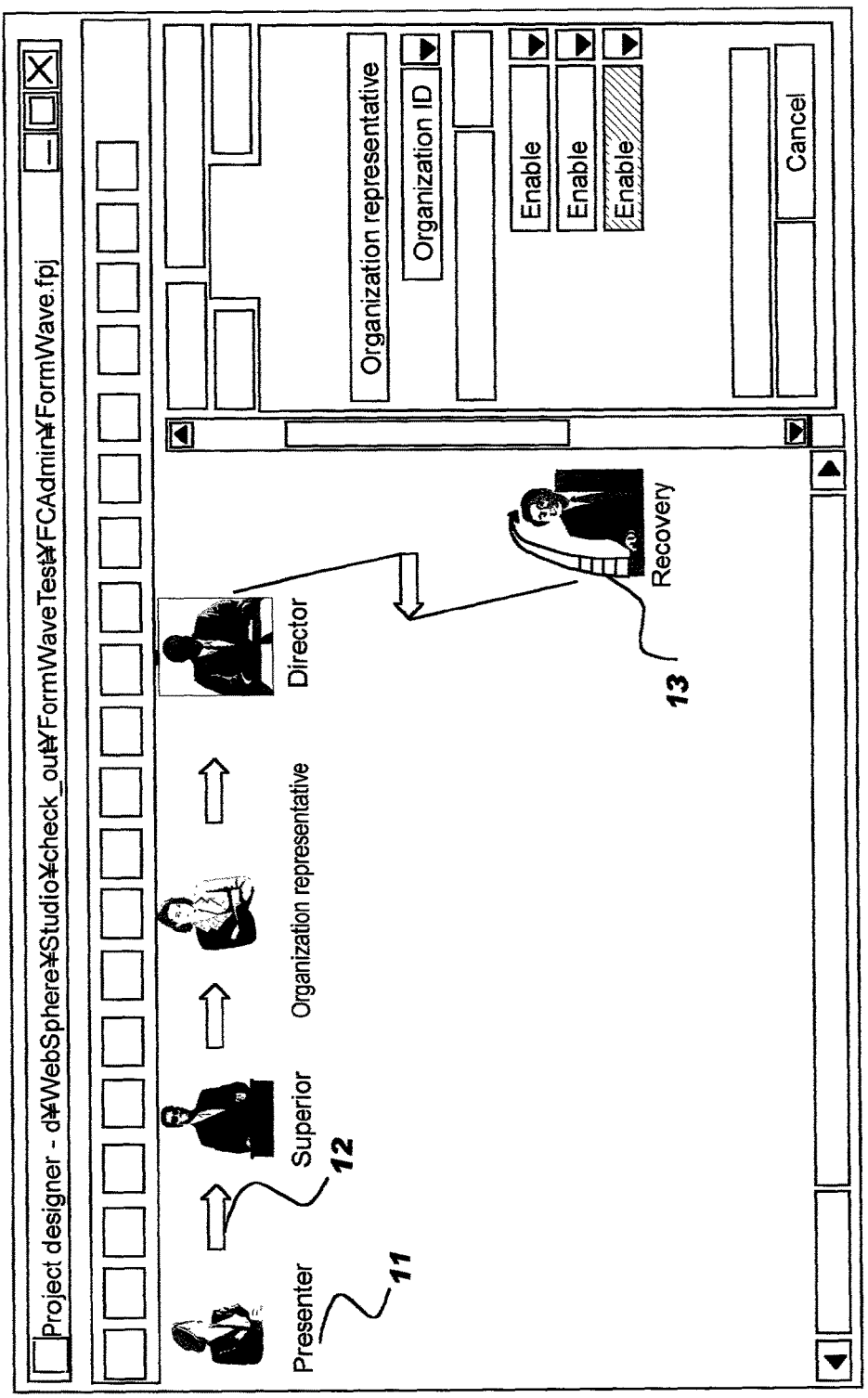
FIG. 3 illustrates an example of a definition screen for skip recoveries.

FIG. 3 depicts an example of a definition screen for skip recoveries. A node shown in FIG. 2(*a*) is implemented as a node icon display 11 in this definition screen, while a path shown in FIG. 2(*a*) is represented by an arrow 12. In the example shown in FIG. 3, a route is shown in which a presenter, a superior, an organization representative and a director participate, wherein the route is defined as composing the managerial decision system. Furthermore, in this example, the attributes of the node of the organization's representative are displayed in properties on the right side of the screen, wherein a flag indicative of whether the node of this organization representative is skippable is set. In the same manner, the second superior node of this definition is also set to be skippable. In order to cause an automatic skip by the workflow server 30 at any node set to be skippable, automatic processing is performed as described below. Furthermore, as shown in FIG. 3, a recovery node 13 is shown with an icon as a design element, which determines a point where the transaction of the skipped person is re-executed. When the transaction is transferred to the recovery node 13, the transaction is transferred again to a person who was skipped in the process according to this definition. Usually, recovery node 13 is located before or after the final person in charge. In the example shown in FIG. 3, it is located after the final transaction. If recovery processing is not to be implemented, recovery node 13 is not located on the route.

Figure 4:
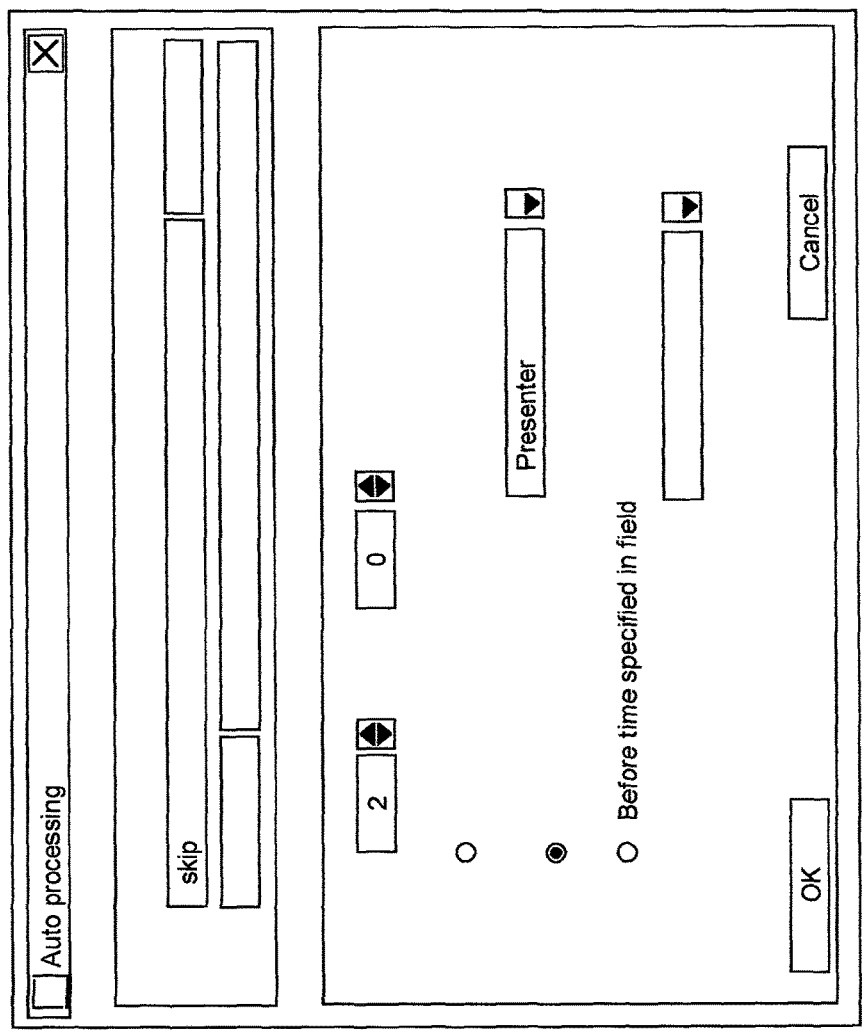
FIG. 4 illustrates an example of a definition screen for automatic processing of an automatic skip execution.

FIG. 4 depicts an example of a definition screen for automatic processing of an automatic skip execution. The automatic processing described above can be defined using a panel as shown in FIG. 4. In this example, the setting of a transaction is set as "skip", while the timing for the transaction is set as "2 days" and its starting point is specified as "since a voucher is received". Namely, this definition means that "If an organization's representative would not have processed a transaction request for more than 2 days after it was received, the request will be skipped". For example, an individual node may be selected as a starting point of the timing for a transaction by selecting "since user processed" as the timing for transaction and by specifying its node name.

The workflow definition created as described above is registered with the workflow server 30. At this time, it is registered with an appended definition ID that specifies the workflow definition uniquely. An individual flow created from the workflow definition is called a "process", while predetermined transactions for each person composing the process is called an "activity".

Each person in charge uses a predetermined operation computer terminal 20 and inputs his own identification information to connect to the workflow server 30. The person in charge may create a new process by referring to the workflow definition or may display any activities sent to him to perform a predetermined transaction. A list of activities assigned to each person in charge is called a "work list". A predetermined transaction for each person in charge corresponds to one node in the workflow definition shown in FIG. 3. When the transaction is finished by the person in charge, the workflow server 30 refers to the workflow definition and then assigns an activity to the next person in charge and places a transaction request in the work list of that person.

Figure 5:
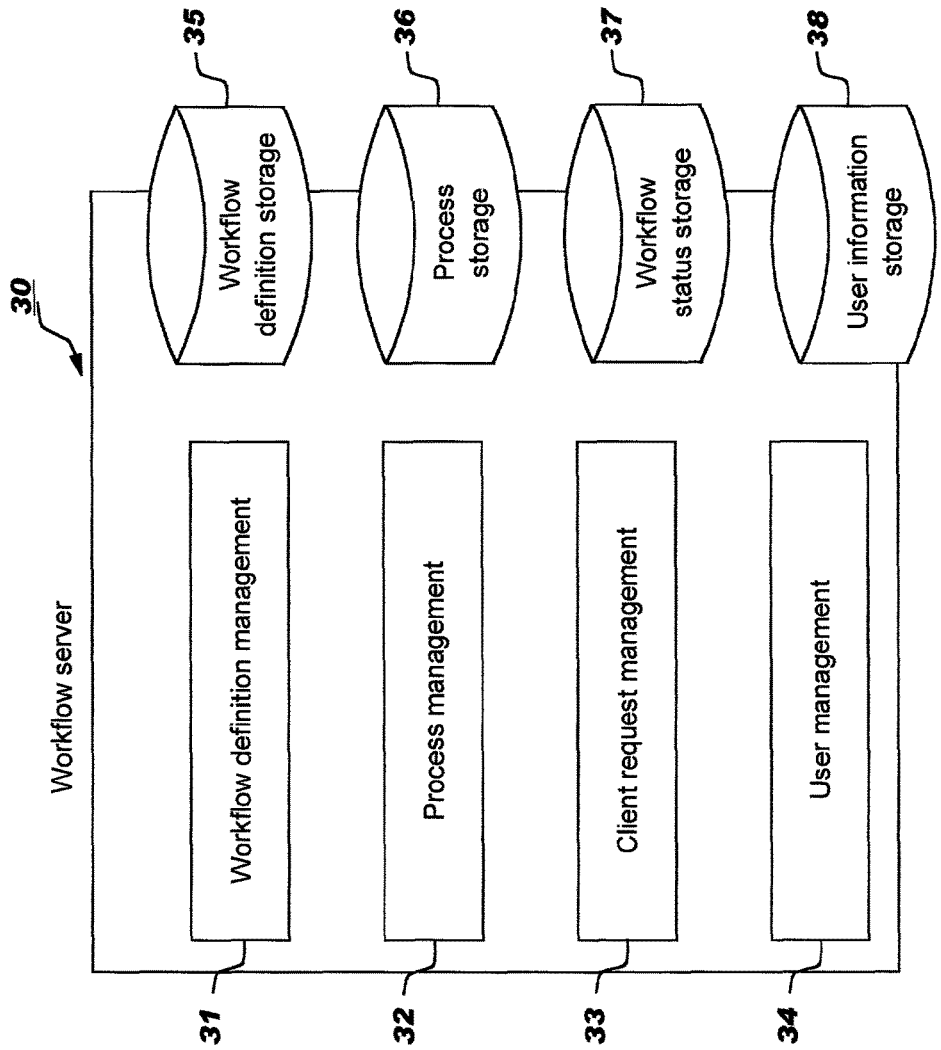
FIG. 5 depicts a schematic configuration of workflow server 30.

FIG. 5 depicts a schematic configuration of workflow server 30. The workflow server 30, in accordance with an embodiment of the present invention, comprises management means (programs) of: workflow definition management 31, process management 32, client request management 33, and user management 34. In addition, the workflow server 30 also comprises storage means of: workflow definition storage 35, process storage 36, workflow status storage 37, and user information storage 38. In FIG. 5, these storage means are shown to be disposed in the workflow server 30, however, they may be disposed anywhere in the network.

Workflow definition management 31 stores and manages the workflow definition defined by the person who defined the transaction of business processes in the workflow definition storage 35. Each of the workflow definitions defined is identified by a definition ID. Registration of new definitions and correction of existing definitions are all managed by workflow definition management 31 using the definition IDs. In addition, when a process designer creates a new process, the workflow definition management 31 creates a list of processes that he can create using the workflow definition storage 35.

Process management 32 manages processes created by the workflow definition management 31. A process comprises a process ID for identifying a plurality of processes created from the same definition and is managed by a combination of a definition ID and process ID. Process storage 36 saves an activity currently being performed, a name of a person who is performing an activity and various kinds of data used in the process. Based on such information stored on process storage 36, the next person in charge is assigned at the end of the activity. Whenever an event occurs such as creation of processes, assignment of activities, and completion of processes, the process management 32 writes the situation into the workflow status storage 37.

Client request management 33 has a function for accepting a request from a person in charge who uses the operation computer terminal 20. Client request management 33 also has a function for providing a list of activities currently assigned to persons in charge or for accepting a request to end an activity from a person in charge. In order to refer to the situation of the process in which the person in charge (the transactor) participates, information stored in the workflow status storage 37 is used.

User management 34 controls users who can participate in the workflow system, and registers user information with user information storage 38 and accesses it if necessary. When a new user attempts to connect to the system using the operation computer terminal 20, user management 34 checks the user ID and password. Moreover, user information storage 38 stores other information, such as: organizations to which users belong, a hierarchical structure of organizations, superior relations of users, and authority classification of users, etc. This kind of information is referenced when process management 32 assigns a person to a next activity. Referred information differs depending on attributes of nodes in the workflow definition.

Operations of the workflow system will now be described in accordance with an embodiment of the present invention. It is assumed that workflow definitions, as shown in FIG. 3, have been registered in advance. According to the workflow definitions of FIG. 3, when the process using it begins, an activity corresponding to a presenter is first executed, wherein a starter (issuer) is assigned as a transactor (i.e., person in charge). In case of a managerial decision system, the same person who activates the process creates and presents materials for managerial decision. Completion of transaction is sent from the presenter (user A) who is a first transactor (issuer) to the workflow server 30, and then a next transactor is assigned. A superior (user B) serving as next transactor has been specified as superior of the first transactor, wherein a transaction request is retained in the work list of the superior serving as a transactor. The workflow server 30 records in the workflow status storage 37 that it has assigned the transaction to the superior.

Usually, the superior (user B) connects to the workflow server 30 and retrieves the transaction request from his own work list to perform its transaction. Here it is assumed that the superior (user B) can not perform the transaction due to a sudden business trip or the like. Furthermore, it is assumed that the superior (user B) has not specified a person who can act for himself (so-called alternate). In this case, the presenter (user A) as an issuer can refer to the situation of the process and issue a command to skip the current transactor. Upon issuance of this command, the workflow server 30 retrieves the transaction request from the work list of the superior (user B), and then describes in the skip list of that process, stored in the process storage 36, that this superior (user B) was skipped, and then assigns a next transactor. In the example shown in FIG. 3, an organization's representative (user C) is defined as a next transactor, thus, the transaction is assigned to this person serving as an actual transactor.

It is assumed that this organization's representative is also in a situation where he cannot deal with the assigned transaction, however, this node is defined such that the transaction request is to be skipped automatically after two days. Therefore, if the transaction won't be performed in two days, the workflow server 30 retrieves the transaction request from the work list of the organization's representative (user C), and then describes in the skip list of that process in the process storage 36 that this organization's representative (user B) was skipped, and then transfers the transaction request to a director (user D) serving as a next transactor. After the director has finished the transaction, the workflow server 30 proceeds to the processing of recovery node 13. In recovery node 13, workflow server 30 performs processing referring to the skip list of the process (i.e., user B, user C). Namely, the transaction request will be passed in sequence to all users who have been skipped for this process. After all skipped users have finished the transaction, the transaction of the recovery node 13 is ended, and consequently this process is also ended.

Figure 6:
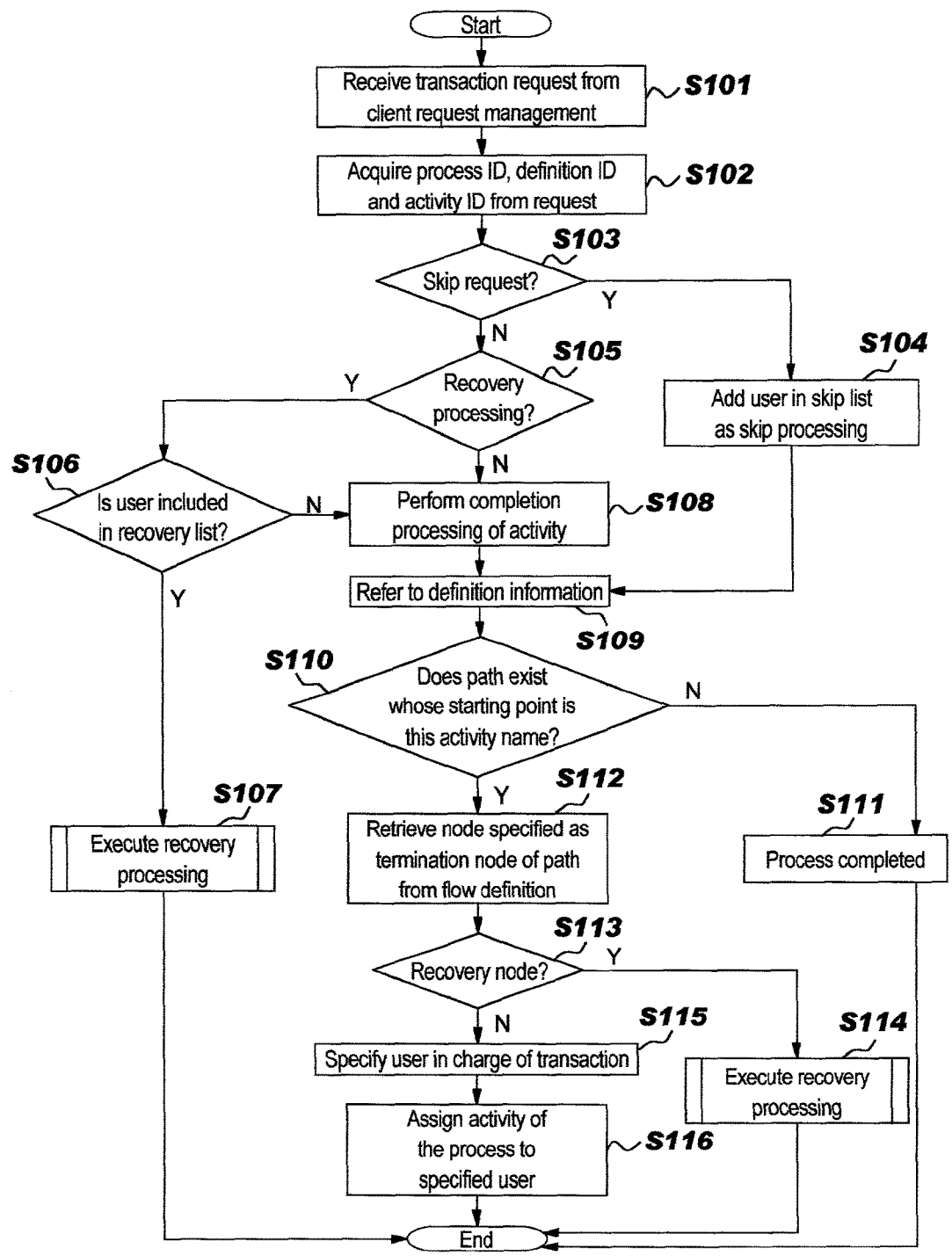
FIG. 6 is a flowchart illustrating a procedure in response to receipt of a transaction request from each user (person in charge)

FIG. 6 is a flowchart illustrating a procedure in response to receipt of a transaction request from each user (person in charge), which shows the flow of transaction performed in process management 32 of workflow server 30. A transaction request from a person in charge using operation computer terminal 20 is accepted at client request management 33. Process management 32 receives the transaction request of the person in charge from client request management 33 (step 101), then acquires a process ID, definition ID, and activity ID from this transaction request (step 102).

Next, it is determined whether this transaction request is a skip request (step 103). If it is a skip request, the user is added to the skip list in the process storage 36 as skip processing (step 104), then the flow goes to step 109. On the other hand, if the request is not the skip request in step 103, then it is determined whether the request is recovery processing (step 105). If it is recovery processing, then a determination is made whether the user is included in the recovery list in process storage 36 (step 106). If the user is included in the recovery list, then the recovery processing is performed (step 107) and the transaction request from the client is ended. If the user is not included in the recovery list in step 106, the flow goes to step 108 described below.

If the request is not recovery processing in step 105, completion processing of the activity is performed (step 108). Then, a request for definition information is issued to workflow definition management 31 and then the definition information is referred to (step 109). Thereafter, it is determined whether a path exists whose starting point is the activity name (step 110). If the path does not exist, the process is completed (step 111), then the transaction for the request is ended. On the other hand, the path exists, a node specified as a termination node of the path is retrieved from the flow definition (step 112), then a determination is made whether the retrieved node is a recovery node (step 113). If it is a recovery node, recovery processing is performed (step 114), then the transaction for the request is ended. If the retrieved node is not a recovery node in step 113, a user in charge of transaction is specified (step 115), then an activity is assigned to the specified user (step 116) and the transaction for the request is ended.

Figure 7:
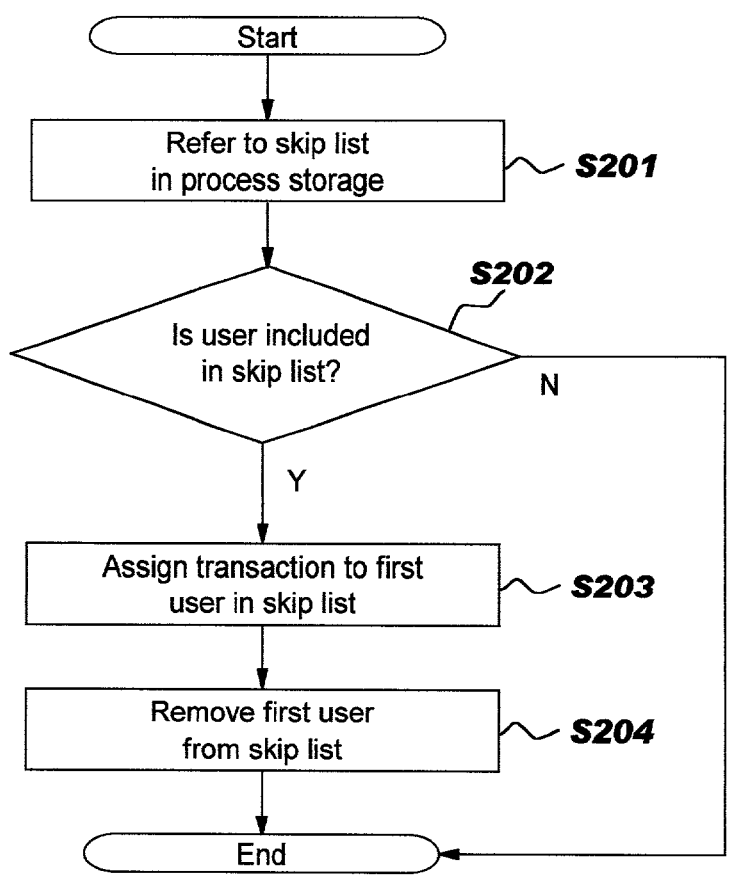
FIG. 7 is a flowchart illustrating a procedure relating to execution of skip processing.

FIG. 7 is a flowchart illustrating a procedure relating to execution of skip processing. In the skip processing, first the skip list in process storage 36 is referred to (skip 201), then a determination is made whether the user is included in the skip list (step 202). If the user is not included in the skip list, the skip processing is ended without performing subsequent processing. If the user is included in the skip list, the transaction is assigned to a first user in the skip list (step 203). Then, the first user is removed from the skip list (step 204) and the skip processing is ended.

In this way, according to the embodiment of the present invention, skippable activities are determined in advance at the time of workflow design, wherein the activity is to be skipped automatically or manually if a delay occurs in the course of execution of instances of the process. Namely, in the workflow system according to the present invention, first at the time of design of the process, setting of "skippable" is defined as a property of each activity. For each activity defined to be skippable, skip processing can be established to be called automatically after a specified deadline for deadline-designated automatic processing. Furthermore, re-execution points (recovery node 13 are established on the workflow where persons in charge of skipped activities can re-execute the transaction. If these points are not established, a re-execution point may be established immediately before completion.

Assuming that instances of the process designed like this are executed and the transaction is assigned to the skippable activities, a user who has the authority can request a skip of the activity from the user interface that monitors the situation of the process. Also, for an activity for which a skip is established based on the deadline-designation, a skip is requested as a result of the deadline processing. At this time, by referring to personnel information, a skip may be requested for an activity for which it is determined that a person in charge is absent.

Upon receipt of a skip request, the workflow engine (workflow server 30) enters the current person in charge into the skip list, and then ends that activity and starts the next activity. The workflow engine checks the skip list at the re-execution point and occurs reassignment to a person in the skip list. A function that the person reassigned can perform is exactly "confirmation". Depending on the setting, an operation for overturning the overall determination is possible (for example, including redoing or stopping the process, or returning to the activity of an essential person in charge).

In this way, according to an embodiment of the present invention, a person in charge cannot be simply skipped and cannot be removed from the process, thereby enabling rapid processing as well as leading to high utilization of the workflow. Namely, the workflow system of the present invention is useful for the transaction of business processes involved in forms where confirmation or follow-up confirmation is approved.

As mentioned above, according to the present invention, a delay of processing on a workflow is avoided by the introduction of skips upon execution of the workflow. Moreover, a person in charge can eventually participate in the workflow process even if he has been skipped.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method for executing a workflow executed at a plurality of computer terminals connected to a network, the method comprising the steps of:
defining in a workflow system executing in memory of a computer, an activity by arranging in a design tool of the workflow system a multiplicity of nodes and a connecting path between each of the nodes, each node representing a pre-determined business process assigned to a person, the connecting paths defining a processing sequence of transactions between all of the pre-determined business processes assigned to different persons;
further defining for each of the nodes, a property indicating whether or not a corresponding one of the pre-determined business processes is skippable and a timing condition indicating a timed condition responsive to which the corresponding one of the pre-determined business processes is to be skipped in favor of a next one of the pre-determined business processes in the processing sequence;
executing the activity in the workflow system;
receiving in connection with the activity, a transaction request from an end user;
determining if the transaction request has a skippable property and a timed condition that has been met; and,
on condition that the transaction request has a skippable property and a timed condition that has been met, adding the end user to a skip list as skip processing, but otherwise determining if recovery processing is requested and if the end user is included in a recovery list and on condition that recovery processing is requested and the end user is included in the recovery list, executing recovery processing for the transaction request.

2. The method of claim 1, wherein completion of processing of the activity is performed in response to a determination that the recovery processing is not requested.

3. The method of claim 1, wherein completion of processing of the activity is performed in response to a determination that the recovery processing is requested but that the end user is not included in the recovery list.

4. The method of claim 1, wherein in response to a determination that the request has a skippable property, determining if a path exists whose starting point is a name of the activity and in response to a determination that a path does exist whose starting point is a name of the activity, retrieving a node specified as a termination node of the path and executing recovery processing in response to determining that the retrieved node is a recovery node, but otherwise assigning the activity to the end user.

5. The method of claim 1, wherein responding to a determination that the request has a skippable property by performing skip processing utilizing the skip list.

6. The method of claim 5, wherein the skip processing comprises assigning the transaction subject to the transaction request to a first user listed in the skip list and removing the the first user from the skip list.

7. A computer program product comprising a non-transitory computer-readable storage medium storing program code executable by a computer, the program code when executing in memory of a computer, performs the steps of:
defining in a workflow system executing in memory of a computer, an activity by arranging in a design tool of the workflow system a multiplicity of nodes and a connecting path between each of the nodes, each node representing a pre-determined business process assigned to a person, the connecting paths defining a processing sequence of transactions between all of the pre-determined business processes assigned to different persons;

further defining for each of the nodes, a property indicating whether or not a corresponding one of the pre-determined business processes is skippable and a timing condition indicating a timed condition responsive to which the corresponding one of the pre-determined business processes is to be skipped in favor of a next one of the pre-determined business processes in the processing sequence;

executing the activity in the workflow system;

determining if the transaction request has a skippable property and a timed condition that has been met; and, on condition that the transaction request has a skippable property and a timed condition that has been met, adding the end user to a skip list as skip processing, but otherwise determining if recovery processing is requested and if the end user is included in a recovery list and on condition that recovery processing is requested and the end user is included in the recovery list, executing recovery processing for the transaction request.

8. The computer program product of claim 7, wherein completion of processing of the activity is performed in response to a determination that the recovery processing is not requested.

9. The computer program product of claim 7, wherein completion of processing of the activity is performed in response to a determination that the recovery processing is requested but that the end user is not included in the recovery list.

10. The computer program product of claim 7, wherein in response to a determination that the request has a skippable property, determining if a path exists whose starting point is a name of the activity and in response to a determination that a path does exist whose starting point is a name of the activity, retrieving a node specified as a termination node of the path and executing recovery processing in response to determining that the retrieved node is a recovery node, but otherwise assigning the activity to the end user.

11. The computer program product of claim 7, wherein responding to a determination that the request has a skippable property by performing skip processing utilizing the skip list.

12. The computer program product of claim 11, wherein the skip processing comprises assigning the transaction subject to the transaction request to a first user listed in the skip list and removing the first user from the skip list.

* * * * *